United States Patent [19]

Kaczeus et al.

[11] Patent Number: 4,614,989
[45] Date of Patent: Sep. 30, 1986

[54] HELICAL BAND DRIVE FOR DISC STORAGE APPARATUS

[75] Inventors: Steven Kaczeus, Santa Cruz; Long V. Ngo, San Jose, both of Calif.

[73] Assignee: Seagate Technology, Scotts Valley, Calif.

[21] Appl. No.: 595,894

[22] Filed: Apr. 2, 1984

[51] Int. Cl.[4] .......................... G11B 5/55; G11B 21/08
[52] U.S. Cl. ..................................... 360/106; 74/89.2
[58] Field of Search ................. 360/106, 109; 74/89.2; 310/12.13, 313; 318/38, 115, 135; 192/149

[56] References Cited

U.S. PATENT DOCUMENTS 3,367,195  2/1968  Racine .................................. 74/89.2
4,456,937  6/1984  Iftikar et al. ........................ 360/106

FOREIGN PATENT DOCUMENTS 59-129973A  1/1983  Japan .

OTHER PUBLICATIONS

IBM/TDB, vol. 19, No. 7, Dec. 1976, pp. 2675-2677, "Dual-Band Access Mechanism" by Fournier.
IBM/TDB, vol. 21, No. 4, Sep. 1978, pp. 1598-1599, "Magnetic Head Band Access Mechanism" by Bailey et al.

Primary Examiner—John H. Wolff
Attorney, Agent, or Firm—Flehr, Hohback, Test, Albritton & Herbert

[57] ABSTRACT

A disc drive includes a stepper drive motor for moving a carriage to any desired position relative to a disc. The drive motor rotates a shaft coupled to the carriage through parallel bands which are helically wound on the motor drive shaft. One band is wound on the shaft while the other is unwound. Thus the drive shaft can rotate through 360° or more.

7 Claims, 6 Drawing Figures

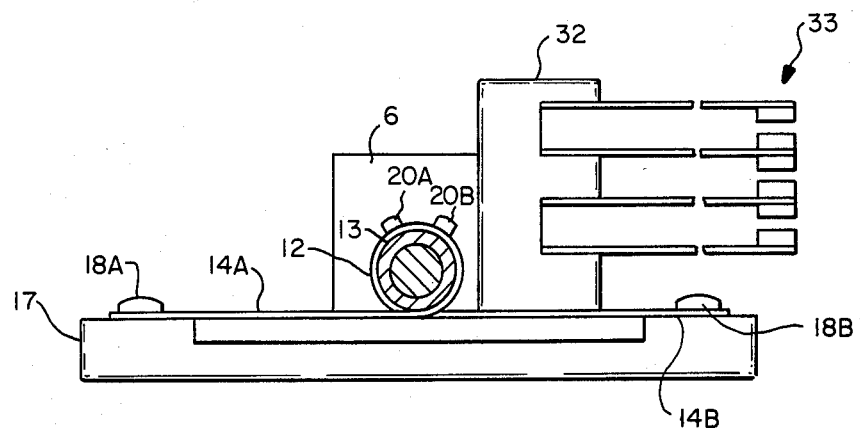
FIG.—1
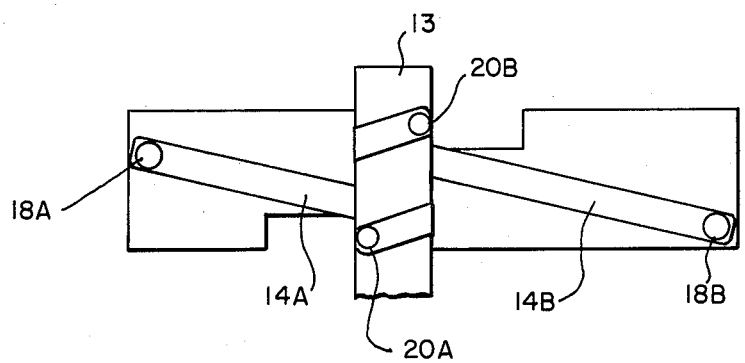
FIG.—2

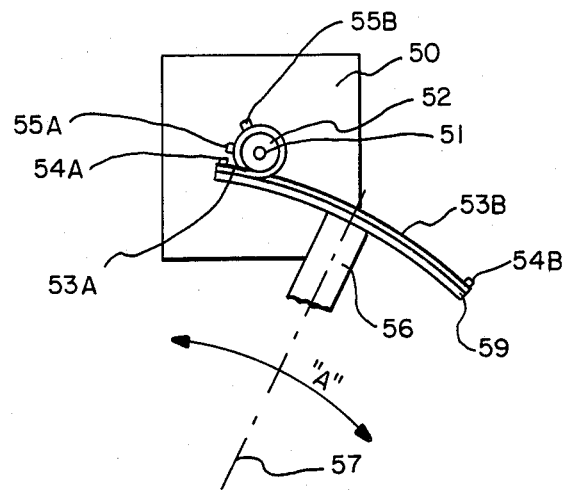
FIG. — 3
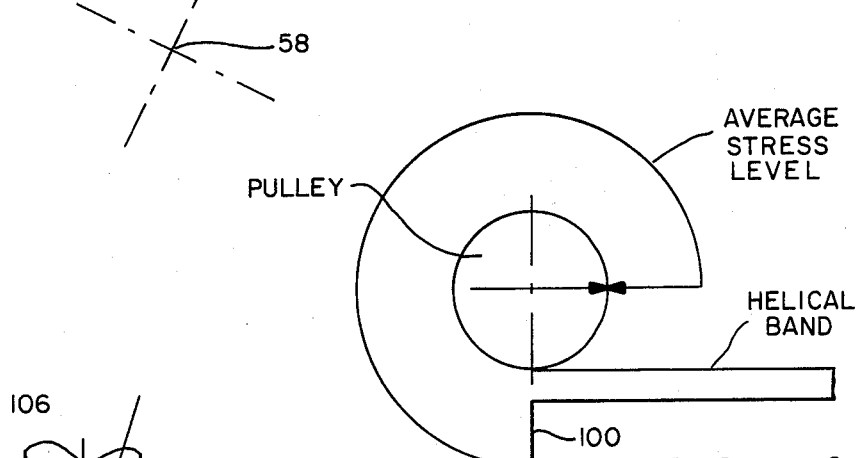
FIG. — 4A
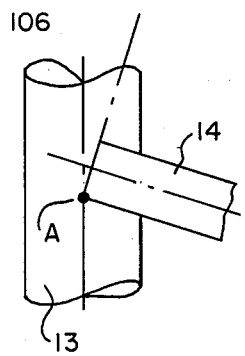
FIG. — 4C
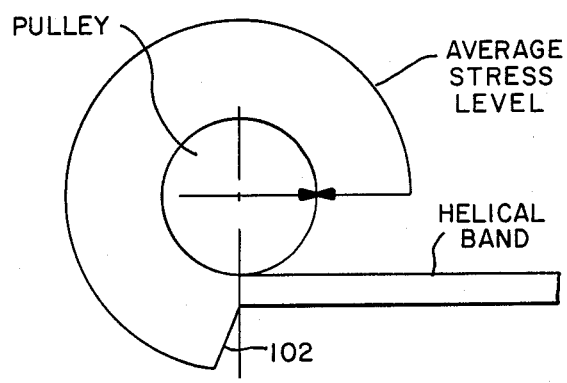
FIG. — 4B

HELICAL BAND DRIVE FOR DISC STORAGE APPARATUS

The subject invention relates generally to a head positioning assembly for disc drive apparatus and more particularly to an improved band drive for use in either a linear or rotary positioning assembly.

Disc drive machines record and reproduce information stored on concentric circular tracks on magnetic discs. Tracks are written and read by magnetic heads which cooperate with the surface of the disc. Various methods have been used to position the head; The two common types of data accessing mechanisms are linear and rotary head carriages. In both types, the objective is to position a magnetic head over a concentric track on the surface of a magnetic disc for reading or writing of information.

Various methods have been used to move the carriage and position the head including lead screws, cams and band drives. Band drives are shown and described in U.S. Pat. Nos. 3,881,139 and 4,161,004, and 4,170,146 among others. These drives convert rotary motion of a stepper motor shaft to motion of the carriage to move the heads mounted on the carriage across the disc to record and read adjacent concentric circular tracks. A typical drive band is wrapped around the motor shaft or a pulley attached to the shaft, and has its ends attached to the carriage so that rotation of the shaft wraps one portion of the band on the pulley while unwrapping the other, causing the carriage to move. A new track is recorded at each step of the stepper motor as it moves the head across the disc.

While band drives have proved to be the most popular form of drive, a long term problem with such drives has been that the total rotation of the motor shaft available to drive the head from the innermost track to the outermost track has been typically limited to less than one complete rotation of the shaft. This is because in the present split band technology, the band tied to the motor drive shaft and to one end of the carriage passes between the two portions of the band which are fastened to the drive shaft and to the other end of the carriage as the carriage is driven back and forth.

It is an object of the present invention to provide an improved band drive for converting the rotary motion of the stepper motor to linear or proportional rotary motion.

Another object of the present invention is to provide a band drive coupled to a stepper motor which allows for more than 360° rotation of the motor shaft.

Another object of this invention is to provide an improved band drive for use with a stepper motor in a disc drive type memory storage apparatus.

Another object of the present invention to provide a rotary head carriage configuration driven by a band drive.

A further objective of the present invention is to provide a band drive in which the band portions attached to each end of the carriage are helically wound on the shaft.

Another objective of the present invention is to provide a helically wound band drive, thereby increasing the number of tracks on a disc drive which may be accessed by increasing the number of steps a stepper motor may take in winding a band from one end of the carriage to the opposite end of the carriage.

In band driven disc drive actuators, the weak link is usually the band, because it is made of relatively thin material and is subjected to frequent near-instantaneous increases in stress as the motor starts and stops. Therefore an object of the invention is to provide a band drive design which reduces or eliminates instantaneous changes in stress on the band.

The above and other objects of the present invention are achieved by a drive mechanism including a stepper drive motor for moving a carriage or the like to any desired position between two extreme positions along a path of travel. The drive motor includes a rotatable shaft coupled to the carriage through a band which is helically wound on the motor drive shaft.

In a preferred embodiment of the present invention it is incorporated into a disc drive having a head positioning apparatus including a carriage which mounts a magnetic head for movement relative to a recording medium; drive means for moving the carriage including a drive motor having a rotatable shaft, the flexible band being helically wound on the shaft to move the carriage. The band is wound on the shaft in two portions, one portion being wound on the shaft while the other is unwound.

By providing a helically wound band, for the first time a stepper motor is allowed to make more than one complete revolution in moving a recording head from track to track in a disc drive, thereby increasing the number of tracks which may be addressed, or, depending on the application, increasing the spacing between the tracks if such is desirable.

The foregoing advantages and objectives of the invention can be more clearly understood from the following description taken in connection with the drawings in which:

FIG. 1 is a side elevational view of a typical linear drive carriage;

FIG. 2 is a plan view of a drive carriage and stepper motor shaft incorporating the helically wound band of the present invention;

FIG. 3 is a plan view of a rotary disc drive actuator which incorporates the present invention.

FIGS. 4A, 4B and 4C are graphic diagrams depicting the stress levels on split and helical bands.

The helically wound band of the present invention was designed to translate the rotary motion of a stepper motor drive shaft to a carriage or other driven object while providing two significant advantages:

1. increasing the number of steps through which the stepper motor can rotate; and
2. reducing the instantaneous changes in stress on the band.

These advantages can be more easily understood by considering the use of the band in one important environment i.e. to drive a head actuator in a disc drive.

In a U.S. Pat. No. 4,323,939 issued Apr. 16, 1982 and entitled "HARD FIXED DISC DRIVE ASSEMBLY AND READ/WRITE HEAD ACTUATOR" assigned to the assignee of this invention there is described a disc apparatus in which the present invention is useful. The disclosure of that patent is incorporated herein by reference.

FIG. 1 shows the basic elements of a linear disc drive head actuator including a stepper motor 6 having a drive shaft 12, a pulley 13 carried at the end of the drive shaft and adapted to receive a drive band 14. The band includes a first portion 14A and a second portion 14B each secured by a screw 18A 18B to a distant end of the carriage and by a screw or other fastener 20A 20B to the drive shaft. Rotation of the drive shaft 12 and pulley 13 clockwise or counterclockwise winds and unwinds the first and second band portions 14A, 14B on the pulley to move the carriage. The carriage includes cut-out portions to allow the drive shaft securing screws or fasteners 20a and 20b to rotate past the plane of the carriage.

The carriage itself mounts an E-shaped or other suitable mount 32 for a plurality of heads 33 which are adapted to cooperate with one or more associated discs. By controlling the stepper motor, the carriage which in this embodiment is a linear carriage, moves linearly along a track to move the heads in and out on the surface of the associated disc to read and write information on the disc surface.

More particularly as clearly appears in FIG. 2, the band portions 14A, 14B helically wind on portions of the pulley 13, thus each band can wind around more than one complete revolution of the pulley, the stepper motor is capable of more than one complete revolution. Further, as can be seen from FIG. 2, as the pulley turns from one end of its allowed rotation to the other, the band portion being wound on the pulley is wound on substantially the same pulley surface area as the other pulley has just ben unwound from. Thus the length of the pulley is minimized, even though no band ever physically lies on top of another portion of the band. Therefore, the carriage can be moved a greater distance, allowing for an increased number of tracks to be defined. This is a highly significant advantage in a technology where increased data storage is of critical importance.

The reason for the control of stress in the band being particularly advantageous, is that this is one of the key points of breakdown in disc drives. Breaks do occur due to the instantaneous changes in stress on the band. It is also known that almost all breaks in the band material occur parallel with the cross section. Therefore, with the band wound helically around the pulley, the present invention produces a larger effective radius and less stress is imposed on the cross section of the band. For example, FIG. 4A depicts the average stress level imposed on a normally wound split band as is now in common use, and particularly the instantaneous change in stress on the band at the point 100 where the band comes in contact with the pulley. In contrast, looking at FIG. 4B, it can be seen that as to any cross section of the band (see the line 106 in FIG. 4C identifying such a cross section) only one point on the cross sectional line reaches the pulley 13 at a time. Therefore, as can be seen from the line 102 of FIG. 4B, the change in stress imposed on any cross sectional area of the band is much more gradual, and therefore easier for the band to absorb and significantly less likely to result in undue aging or breaking of the band. Therefore, a combination of a stepper motor driven pulley and helical band can be expected to have a much longer life than the normally wound bands in present use.

Turning next to FIG. 3, shown therein are the pertinent portions of a rotary actuator embodying the present invention. FIG. 3 demonstrates the means for converting the rotary motion of a stepper motor to rotary motion of a mechanical arm, which can then be used to position a head carrying mechanism. Omitted from FIG. 3 is the actual head carrying mechanism, which can be embodied in various ways known to anyone familiar with the art.

More specifically, FIG. 3 shows a stepper motor 50 having a rotatable shaft 51 on which is mounted a pulley 52. A rotating arm (shown partially at 56) extends along line 57 to pivot point 58. At the distal end of arm 56 is mounted a curved end portion 59 whose radius is the distance from pivot point 58 to a point closely adjacent to the pulley 52. Connecting the pulley 52 to the curved end portion 59 of arm 56 are two helically wound band segments 53A and 53B. One end of each of the band segments 53A, 53B is secured to the ends of the curved end portion 59 of arm 56 by screws or other appropriate fasteners 54A, 54B. The other ends of the band segments 53A, 53B are secured to the pulley 52 by screws or other appropriate fasteners 55A, 55B. As the stepper motor 50 rotates the shaft 51 and attached pulley 52 clockwise or counterclockwise, the band segments 53A, 53B are wound on and unwound from pulley 52 rotating the arm 56 along path "A". The curved end portion 59 of the arm 56 is notched, as shown previously in FIG. 2, to allow clearance for fasteners 55A, 5B, and supports the unwound portions of the band segments 53A, 53B.

The distance that the arm 56 moves along path "A" with each step of the motor 50 is determined by several factors: (a) the amount of rotation the motor makes with each step, (b) the diameter of the pulley 52, and the length of the arm 56.

The total portion of the circular path "A" through which the arm 56 can rotate is dependent only on the length of the band segments 53A, 53B and the length of the curved end portion 59 of the arm 56, since the helically wound band segments allow the pulley to rotate through more than 360°.

As shown herein, a positioning assembly has been provided which is especially useful in a disc drive or the like. Use of this invention provides for an increased number of tracks being recorded on the disc, and for highly accurate positioning of the head in movement across the disc. Further, the life of any machine incorporating this helical band drive is lengthened due to reduced exposure of the band to instantaneous changes in stress.

Other modifications and improvements of the invention disclosed herein may become apparent to one of skill in the art who has reviewed the instant patent application. Therefore the scope of the subject invention is to be limited only by the following claims.

What is claimed is:

1. A positioning apparatus for movably controlling the position of a component between first and second positions, the component being supported for movement between said first and second positions, the apparatus comprising a drive means including a drive motor having a rotatable shaft, a pulley carried on said shaft, first and second distinct bands, one end of each said bands being fastened to to said component, the other end of each said band segment being connected to said pulley, rotation of said shaft wrapping each and unwrapping said band helically on said motor drive pulley thereby permitting said pulley to rotate for at least 360°'s, each said band wrapping on the same angular cross-section of the surface area of the motor drive shaft pulley with one band wrapping onto a portion of the pulley surface area adjacent to the pulley portion left vacant by the unwrapping of the other band to move said component between said first and second positions, whereby each of the bands defines an acute angle with said pulley, said pulleys being arranged in a parallel manner, with the length of the drive shaft being accordingly minimized.

2. Positioning apparatus as claimed in claim 1 wherein said first and second bands are wrapped on portions of said shaft without instantaneous overlap of either band, the shaft being thus adapted to rotate through 360° or more.

3. A positioning apparatus for positioning a magnetic head relative to a recording medium including a carriage adapted to mount said magnetic head to move said head relative to said recording medium, drive means including a drive motor having a rotatable shaft, and flexible band means connected to said carriage and comprising first and second bands each having an end connected to said shaft and helically wound on and unwound from said shaft for moving said carriage, the bands being aligned in parallel and lying at an acute angle to said pulley and wrapping on the same angular cross-section of a surface area of the motor shaft with one band wrapping onto the surface area adjacent to the portion left by the unwrapping of the other band segment, thereby permitting said shaft to rotate for at least 360°'s.

4. Positioning apparatus as claimed in claim 3 wherein each of said first and second bands are at least as long as the full length of travel of said carriage.

5. Positioning apparatus as claimed in claim 4 wherein said drive motor is positioned with said drive shaft perpendicular to said record medium and the direction of travel of said carriage and is adapted to rotate 360°'s or more to extend the length of the path of travel of the carriage.

6. Positioning apparatus as claimed in claim 3 wherein said first and second bands are fastened to opposite ends of the rotatable drive shaft, one of said bands being helically wrapped on said shaft surface area toward the center of said shaft depending on the direction of rotation of said shaft simultaneous with the unwrapping of the other band from said shaft, the center lines of each of said segments lying substantially in parallel along the carriage.

7. Positioning apparatus as claimed in claim 4 wherein said bands are connected to said carriage so that said band portions unwrapped from said drive shaft rest on are supported by said carriage.

* * * * *